Oct. 10, 1950            W. M. CAMP            2,525,284
SLIDER FASTENER STRINGER
Filed Nov. 18, 1944            3 Sheets—Sheet 1
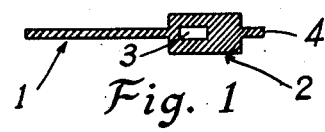
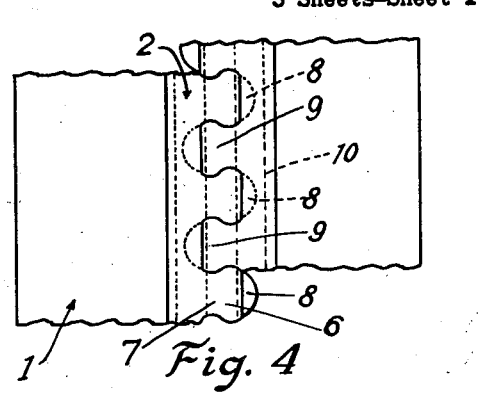
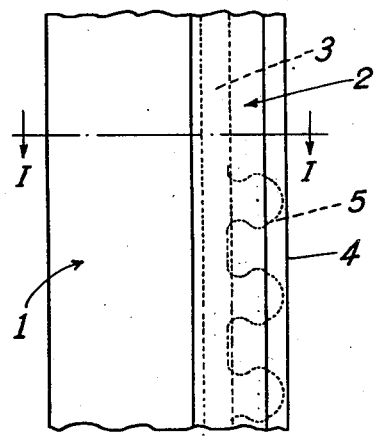
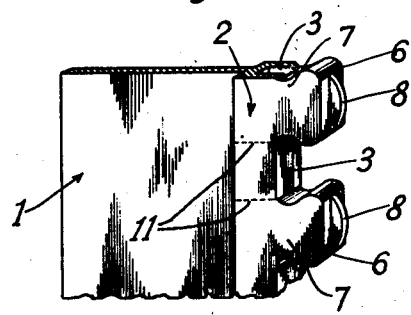
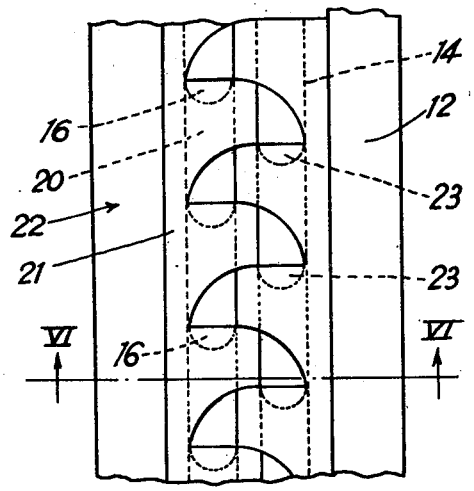
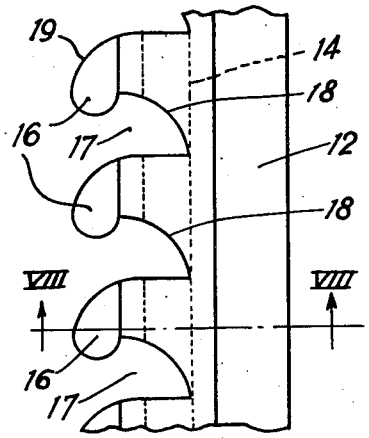
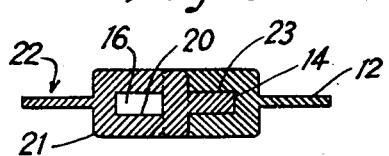
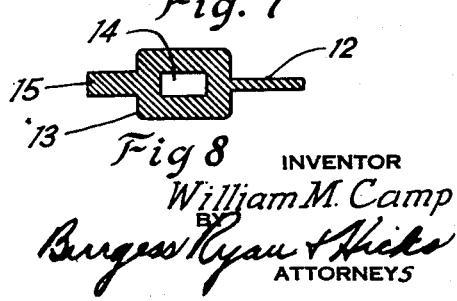
INVENTOR
William M. Camp
BY Burgess Ryan & Hicks
ATTORNEYS Oct. 10, 1950 — W. M. CAMP — 2,525,284
SLIDER FASTENER STRINGER
Filed Nov. 18, 1944 — 3 Sheets-Sheet 2

INVENTOR
William M. Camp
BY Burgess Ryan & Hicks
ATTORNEYS

Oct. 10, 1950 W. M. CAMP 2,525,284
SLIDER FASTENER STRINGER
Filed Nov. 18, 1944 3 Sheets-Sheet 3

INVENTOR
William M. Camp
BY
Burgess Ryan & Hicks
ATTORNEYS

Patented Oct. 10, 1950

2,525,284

UNITED STATES PATENT OFFICE 2,525,284

SLIDER FASTENER STRINGER

William M. Camp, Glen Ridge, N. J., assignor, by mesne assignments, to The Clark Thread Company, Inc., a corporation of Delaware Application November 18, 1944, Serial No. 564,051

2 Claims. (Cl. 24—205.13)

This invention relates to the manufacture of slide fasteners, or "zippers," and has for its primary object the avoidance of the multiplicity of steps heretofore necessary in the manufacture of such fasteners. By the present invention it is possible to produce complete stringers, as they are called, by two inexpensive operations, namely, extrusion and stamping.

Other objects and advantages of the invention will be apparent from the following description and accompanying drawings of several illustrative forms of fastener.

Figure 12:
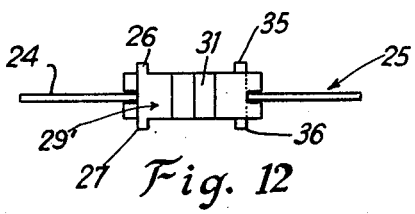
Figure 10:
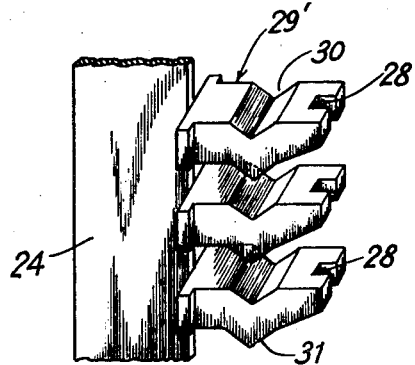
Figure 11:
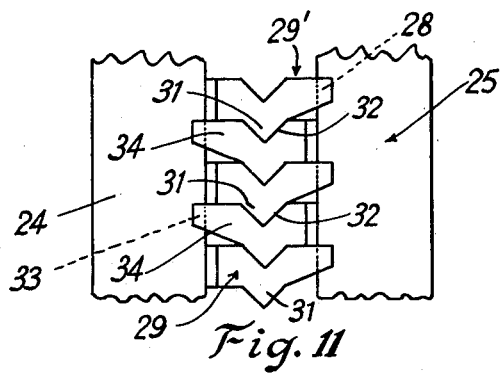
Figure 9:
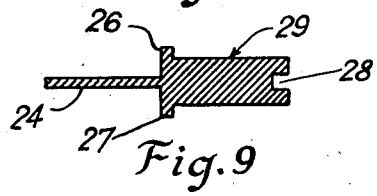
Figure 15:
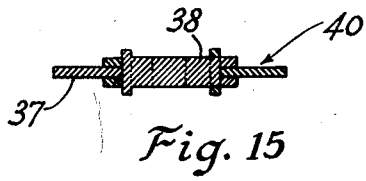
Figure 13:
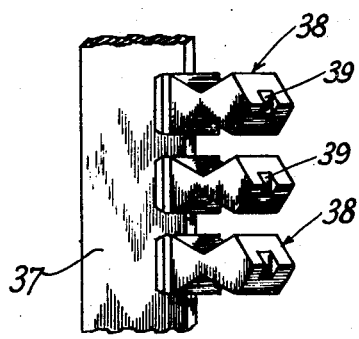
Figure 14:
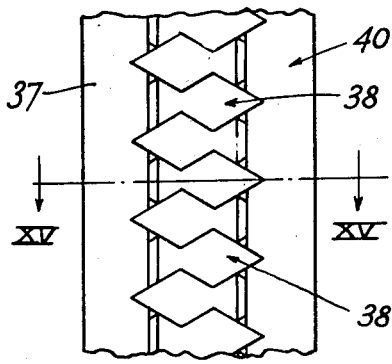
Figure 16:
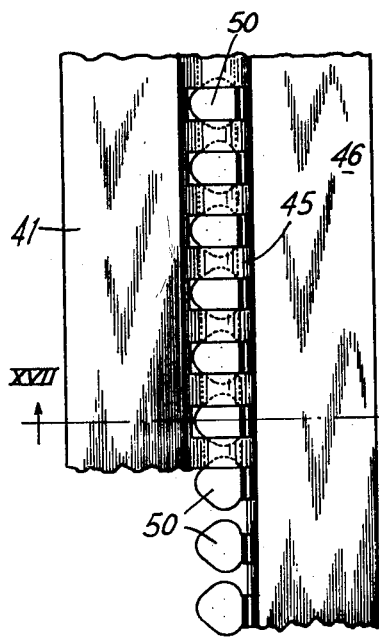
Figures 18, 20:
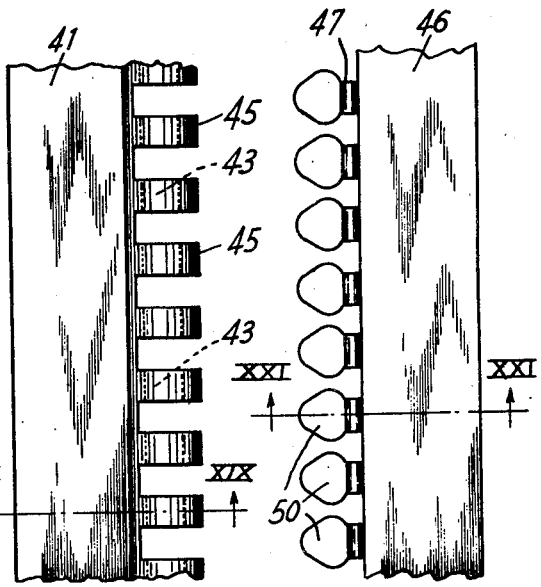
Figure 17:
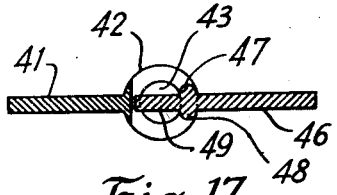
Figure 19:
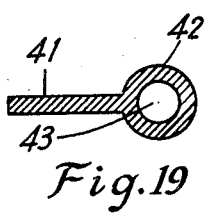
Figure 21:
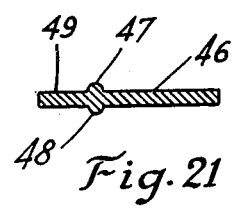

In the drawings, Fig. 1 is a cross-section of one form of extruded stringer, Fig. 2 is an elevation of the same stringer in process of manufacture, Fig. 3 is a perspective view of a portion of the finished stringer, and Fig. 4 is an elevation of portions of two such stringers in assembled relation; Fig. 5 is an assembly elevation of stringers of another form, Fig. 6 is a section on the line VI—VI of Fig. 5; Fig. 7 is an elevation of one of the stringers of Fig. 5 and Fig. 8 is a section on the line VIII—VIII of Fig. 7; Fig. 9 is a cross-section of another form of extruded stringer; Fig. 10 is a perspective view of the same stringer after stamping; Fig. 11 is an elevation of a portion of two such stringers in assembled relation and Fig. 12 is an end view of the same; Fig. 13 is a perspective view of still another form of stringer; Fig. 14 is an elevation of a portion of two such stringers in assembled relation and Fig. 15 is a section on the line 15—15 of Fig. 14; Fig. 16 is an elevation showing still other forms of stringer in assembled relation; Fig. 17 is a section on the line 17—17 of Fig. 16; Fig. 18 is an elevation of the left-hand stringer of Fig. 16; Fig. 19 is a section on the line 19—19 of Fig. 18; Fig. 20 is an elevation of the right-hand stringer of Fig. 16; and Fig. 21 is a section on the line 21—21 of Fig. 20.

The particular material to be utilized for the fasteners herein described forms no part of the present invention since any extrudable material having the necessary strength and pliability will serve. In this connection it may be noted that whereas fastener elements formed of rubberlike materials have heretofore been proposed, the fasteners of the present invention do not depend for secure interlocking upon the resilient gripping of one fastener element by its neighboring elements. As will presently appear, the fastener elements are so constructed and arranged as to have a positive two-way interlock; that is to say, they are interlocked against what is referred to as pull-apart separation and also against transverse separation.

Referring now to the drawings, Fig. 1 illustrates an extruded section suitable for making stringers in accordance with the present invention. As shown, it includes what will be referred to as a tape portion, generally designated 1, and a body portion, generally designated 2. The tape portion, as will be understood, corresponds to and substitutes for the customary textile tape on which separate fastener elements are usually mounted; and the body portion is that part of the extruded strip from which the fastener elements are formed. The relatively thick body portion, as extruded, is provided with a continuous channel 3 and, on what for convenience will be referred to as the outer edge of the stringer or body portion, with a relatively thin web 4.

According to the method of the present invention, the continuous extruded strip, combining the tape and body portions as described, is fed through a suitable press by which portions of the strip are punched out. In this particular form, for example, the die is shaped to stamp out part of the body portion as on the dotted line 5 of Fig. 2. The resulting stringer, illustrated in Fig. 3, includes a series of spaced heads 6 connected to the remainder of the body portion by necks 7 and forming individual fastener elements; and of the original continuous web 4 of the extruded section there remain only the individual web portions 8, one on each element. Between the heads 6 the punch line is spaced inwardly from the edge of the stringer a distance such as to intersect and thereby open or expose the channel 3, as shown in Figs. 2 and 3.

In the result, there is formed a continuous stringer which can be fully interlocked with a like stringer. As shown in Fig. 4, when two such stringers are brought together, each of the heads 6 of one stringer nests between corresponding heads 9 of the companion stringer thereby firmly interlocking the two stringers against pull-apart separation. At the same time the web portions 8, say of the left-hand stringer, enter the channels 10 of the right-hand stringer, thereby interlocking the two stringers against transverse separation. Similarly, of course, the web portions of the right-hand elements enter the channels of the left-hand stringer.

As will be understood the tape portions of the stringers are intended to be secured in the customary fashion to the material forming the opposite side slit or opening which the fasteners are designed to close.

The means by which the stringers are interlocked and disengaged forms no part of the present invention since, as will be apparent, any of the well-known types of slider can be used for the purpose. Depending on the particular design of the slider and the character of the material of which the extruded stringers are formed, the flexibility of the body portions of the stringers can be increased by transversely slitting such body portions at spaced intervals, as indicated by the dotted lines 11 in Fig. 3. This slitting operation can be performed coincidently with the punching operation.

In the form of the invention illustrated in Figs. 5 to 8, inclusive, the extruded section, as shown in Fig. 8, is quite similar to that already described, including a tape portion 12, a body portion 13 having a continuous channel 14 and a continuous web 15 extending along the outer edge of the body portion. In this instance, however, the extruded strip is stamped out to a different configuration and to a greater depth inwardly from the edge of the stringer than that above described. As shown in Fig. 7, the fastener elements remaining after the punching operation include the portions 16 of the original continuous web 15 overhanging the bays or intervening spaces 17, the latter being cut in from the edge of the stringer to the rear face or wall of the channel 14, i. e. the right-hand wall as viewed in Fig. 8. Also, the upper wall 18 of each of the bays 17 is of arcuate shape conforming substantially to the curvature of the wall 19 of each web 16.

When two such stringers are brought together by any suitable slider, as before, they fully interlock. As indicated by the dotted lines in Fig. 5, the depending portions 16 of the right-hand stringer enter the open ends of the channel 20 (corresponding to the channel 14) in the body portion 21 of the left-hand stringer 22. Similarly the depending portions 23 of the left-hand stringer enter the channel 14 of the right-hand stringer, whereby the stringers are securely interlocked against both pull-apart and transverse separation. While the precise shape of the fastener elements is unimportant, it will be observed that with the configuration described and illustrated, a neat and snug closure is provided.

In the form of the invention shown in Figs. 9 to 12, inclusive, the extruded strip is of a different section. As shown in Fig. 9, it includes a tape portion 24 and a body portion 29 having upstanding ribs 26, 27 on its side surfaces adjacent its junction with the tape portion. In this instance a channel 28 is formed in the outer edge of the body portion.

As before, the extruded strip is next subjected to a punching operation to convert the body portion into individual fastener elements, of which one possible form is shown in Fig. 10. In this form each fastener element 29' has a transverse notch or V-shaped recess 30 extending across its upper surface and a corresponding V-shaped projection 31 extending across its lower surface. As will be observed, the punching in this instance extends inwardly from the outer edge of the stringer clear back to the tape portion 24, adapting the stringer for full-mesh mating with a corresponding stringer generally designated 25 in Figs. 11 and 12. When so meshed, the V-shaped projections 31 of the left-hand stringer interlock with the V-shaped recesses 32 of the fastener elements of stringer 25, thereby interlocking the two stringers against pull-apart separation. At the same time, the channels on the outer ends of the fastener elements 29' receive the exposed edges of the tape portion of stringer 25, and the tape portion 24 of the left-hand stringer is similarly received by the channels 33 on the outer ends of the fastener elements 34 of stringer 25, thereby interlocking the two stringers against transverse separation. In this form the ribs 26 and 27 on fastener elements 29' and the corresponding ribs 35, 36 on the fastener elements 34 may be utilized for drawing the stringers and fastener elements together as by a suitable slider.

The form of the invention illustrated in Figs. 13 to 15, inclusive, is quite similar to that just described, differing from it only in the configuration of the individual fastener elements. In this form the tape portion 37 carries fastener elements 38 having coupling end portions of more or less diamond shape, the outer edge of each head being traversed as before by a channel 39. In other words, the original extruded section is just like that shown in Fig. 9. As shown in Figs. 14 and 15, a stringer so extruded and punched out interlocks with a similarly formed stringer 40 in quite the same manner as that already described in connection with the form shown in Figs. 9 to 12.

In the form of the invention shown in Figs. 16 to 21, inclusive, two dissimilar stringers are utilized but both produced by the extruding and punching method common to all of the other forms.

In this instance one of the stringers, say, the left-hand stringer, is extruded in a continuous strip having the section shown in Fig. 19 and comprising a tape portion 41 and a body portion 42. The body portion is hollow or channelled, as indicated at 43. So extruded, this strip is then punched out, as shown in the Fig. 18 elevational view, to provide the individual spaced fastener elements 45, the spaces or bays between the fastener elements being cut back into the body portion 42 to a depth slightly beyond the inner wall of channel 43.

The companion or right-hand stringer is extruded in a form having the section shown in Fig. 21, including a tape portion 46, continuous upper and lower ribs 47 and 48 and a projecting web portion 49. So extruded, this stringer is punched out as shown in Fig. 20 to provide the individual spaced heads or fastener elements 50.

When brought together these two stringers interlock as indicated in Figs. 16 and 17. As there shown, the upper and lower side portions of the heads 50 of the right-hand stringer enter the channels 43 of the left-hand stringer, thereby interlocking the two stringers against both pull-apart and transverse separation.

In the light of the foregoing description of a number of different forms of the invention, the following is claimed:

1. A slide fastener stringer comprising a one-piece strip of extrudable section and including a relatively thin tape portion and a relatively thick body portion, said body portion having individual fastener elements spaced longitudinally thereof with each said element extending the entire width of the body portion so as to expose between each pair of elements a length of said tape portion, each said element having a solid section throughout a portion of its width, said solid section being spaced inwardly and separated from the free edge of the body portion by an intervening portion of different section, said solid section having a projection on one side and a depression on the other side thereof to provide pull-apart interlock with like sections of like elements of a companion stringer, and said intervening portion having means for providing transverse interlock with a companion stringer by engaging an exposed length of said tape portion of said companion stringer.

2. A slide fastener stringer comprising a one-piece strip of extrudable section and including a relatively thin tape portion and a relatively thick body portion, said body portion having individual fastener elements spaced longitudinally thereof with each said element extending the entire width of the body portion so as to expose between each pair of elements a length of said tape portion, each said element having a solid section throughout a portion of its width, said solid section being spaced inwardly and separated from the free edge of the body portion by an intervening portion of different section, said solid section having a projection on one side and a depression on the other side thereof to provide pull-apart interlock with like sections of like elements of a companion stringer, said intervening portion having means for providing transverse interlock with a companion stringer, said means comprising a channel in said intervening portion opening through said free edge, said channel being engageable with an exposed length of said tape portion of said companion stringer.

WILLIAM M. CAMP.

REFERENCES CITED

The following references are of record in the file of this patent:

UNITED STATES PATENTS

| Number | Name | Date |
|---|---|---|
| 1,719,856 | Sipe | July 9, 1929 |
| 1,738,885 | Gemberling | Dec. 10, 1929 |
| 1,960,997 | Halloran | May 29, 1934 |
| 2,013,071 | Sipe | Sept. 3, 1935 |
| 2,035,028 | Temple | Mar. 24, 1936 |
| 2,048,544 | Fritts | July 21, 1936 |
| 2,137,887 | Abbott | Nov. 22, 1938 |
| 2,262,881 | Boenecke | Nov. 18, 1941 |
| 2,307,410 | Kuna | Jan. 5, 1943 |
| 2,366,948 | Winterhalter | Jan. 9, 1945 |
| 2,378,719 | Morin | June 19, 1945 |